United States Patent Office 3,787,390
Patented Jan. 22, 1974

3,787,390
ANALOGS OF LINCOMYCIN AND PROCESS
Robert D. Birkenmeyer, Comstock, Mich., assignor to
The Upjohn Company, Kalamazoo, Mich.
No Drawing. Filed June 23, 1971, Ser. No. 156,099
Int. Cl. C07c 47/18
U.S. Cl. 260—210 R
6 Claims

ABSTRACT OF THE DISCLOSURE

Clindamycin analogs of the formula

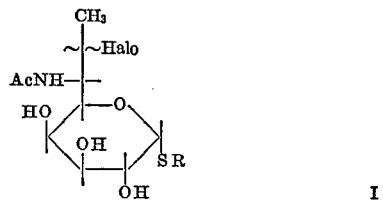

wherein Ac is the acyl of a 1-(2-hydroxyethyl)-L-2-pyrrolidinecarboxylic acid are prepared by N-alkylation of the corresponding 1-unsubstituted compounds. The compound has clindamycin-like antibacterial activity.

BRIEF SUMMARY OF THE INVENTION

This invention relates to novel compounds and to a process for preparing them and is particularly directed to 1'-(2-hydroxyethyl)-1'-demethylclindamycin (7-halo-7-dexoy-1'-(2-hydroxyethyl)-1'-demethyllincomycin) and analogs thereof, as well as esters and ethers thereof, and to processes whereby they and like compounds are produced. These compounds have clindamycin-like antibacterial activity and can be used in a like manner. They, moreover, have improved Gram-negative activity and have lower mammalian toxicity.

The novel compounds of the invention can be represented by the following structural formula:

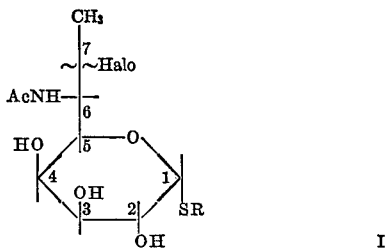

wherein Halo is chlorine, bromine, or iodine; R is alkyl of not more than 4 carbon atoms, to wit, methyl, ethyl, propyl, isopropyl, butyl, isobutyl, sec.butyl, and tert.butyl, or 2-hydroxyethyl, and Ac is the acyl radical of an L-2-pyrrolidinecarboxylic acid of the formulas:

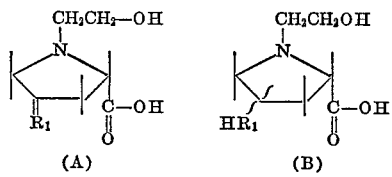

wherein $R_1$ is hydrogen or alkylidene of not more than 8 carbon atoms (including methylene). Thus $HR_1$ can be two hydrogens or an alkyl of not more than 8 carbon atoms. Any or all of the 2-, 3-, and 4-hydroxyl groups can be esterified or etherified.

Examples of alkyl of not more than 8 carbon atoms ($HR_1$) are methyl, ethyl, propyl, butyl, pentyl, hexyl, heptyl, octyl, and the isomeric forms thereof. Examples of alkylidene groups ($R_1$) include methylene, ethylidene, propylidene, butylidene, pentylidene, hexylidene, heptylidene, and octylidene, and the isomeric forms thereof.

The novel compounds of the invention, Formulas IA and IB (Formulas IA and IB are Formula I where Ac is the acyl of acids A and B respectively) can be prepared by N-alkylating with a 2-hydroxyethyl alkylating agent a 1'-demethylclindamycin or analog thereof of Formula I where Ac is the acyl radical of a 4-substituted-L-2-pyrrolidinecarboxylic acid of the formulas:

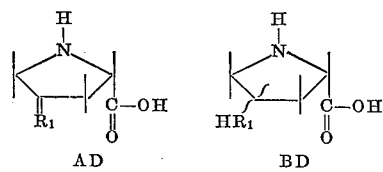

The preparation of compounds of Formula IAD and Formula IBD is disclosed in U.S. Pats. 3,496,163 and 3,502,648.

An alternative process is to alkylate acids AD and BD to form acids A and B and to acylate a compound of the formula:

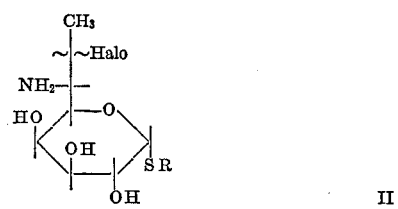

with the acids A and B. The preparation of compounds of Formula II is also disclosed in U.S. Pat. 3,502,648. The acylation of the compounds of Formula II with acids AD and BD can be effected by the procedure of the above-noted patents, wherein a mixed anhydride with isobutylchloroformate is used as the acylating agent.

DETAILED DESCRIPTION

The N-alkylation of compounds of Formula IAD or Formula IBD, or of the acids AD or BD is effected by reacting the starting compound with ethylene oxide. The starting material, advantageously as the hydrochloride acid addition salt, is heated with the ethylene oxide, preferably in a pressure vessel, in which the reaction proceeds as follows:

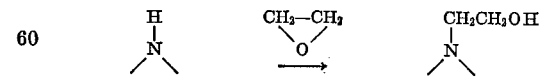

The reaction mixture after cooling is worked up in the usual manner using such procedures as distillation, solvent extraction, crystallization and the like.

The proportions are not critical but an excess of ethylene oxide is desirable. An excess of from 2 to 100 times the stoichiometric amount is suitable. The temperature also is not critical. At temperatures below about 35° C., however, the reaction is undesirably slow and ordinarily it will not be necessary or desirable to exceed about 200° C. The reaction proceeds well at 100° C.

Advantageously the reaction is carried out in an inert mutual solvent for the reactants. Suitable such solvents include methyl alcohol, ethyl alcohol, propyl alcohol, benzene, touene, cyclohexane, and tetrahydrofuran.

Alternatively the alkyation can be effected by a reductive alkylation such as described in U.S. Pat. 3,496,163, part G1–4, by substituting the formaldehyde (formalin) by hydroxyacetaldehyde.

Any or all of the 2-, 3-, and 4-hydroxy groups can be esterified before the reaction, for example with hydrocarbon carboxylic acids, advantageously of not more than 18 carbon atoms, or halo-, nitro-, hydroxy-, amino-, cyano-, thiocyano-, or alkoxy substituted hydrocarbon carboxylic acids, advantageously also of not more than 18 carbon atoms. These acylates also have antibacterial activity.

Examples of carboxylic acid acyl radicals are the acyl radicals of the following acids: (a) saturated or unsaturated, straight or branched chain aliphatic carboxylic acids, for example acetic, propionic, butyric, isobutyric, tert.-butylacetic, valeric, isovaleric, caproic, caprylic, decanoic, dodecanoic, tridecoic, myristic, pentadecanoic, palmitic, margaric, stearic, acrylic, crotonic, undecylenic, oleic, hexynoic, heptynoic, octynoic acids, and the like; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) saturated or unsaturated, alicyclic aliphatic carboxylic acids, for example, cyclopentaneacetic acid, cyclopentanepropionic acid, cyclohexanebutyric acid, methylcyclohexaneacetic acid, and the like; (d) aromatic carboxylic acids, for example, benzoic acid, toluic acid, naphthoic acid, ethylbenzoic acid, isobutylbenzoic acid, methylbutylbenzoic acid, and the like; and (e) aromatic-aliphatic carboxylic acids, for example, phenylacetic acid, phenylpropionic acid, phenylvaleric acid, cinnamic acid, phenylpropiolic acid and naphthylacetic acid, and the like. Suitable halo-, nitro-, hydroxy-, amino-, cyano-, thiocyano-, and lower alkoxyhydrocarbon carboxylic acids include hydrocarbon carboxylic acids as given above which are substituted by one or more of halogen, nitro, hydroxy, amino, cyano, or thiocyano, containing a total of not more than 18 carbon atoms, or alkoxyhydrocarbon carboxylic acids of not more than 18 carbon atoms. Suitable such alkoxy groups include methoxy, ethoxy, propoxy, butoxy, amyloxy, hexyloxy, dodecyloxy, hexadecyloxy, and isomeric forms thereof. Examples of such substituted hydrocarbon carboxylic acids are mono-, di-, and trichloroacetic acid; α- and β-chloropropionic acid; α- and γ-bromobutyric acid; α- and β-iodovaleric acid; mevalonic acid; 2- and 4-chlorocyclohexanecarboxylic acid; shikimic acid; 2-nitro-1-methylcyclobutanecarboxylic acid; 1,2,3,4,5,6-hexachlorocyclohexanecarboxylic acid; 3-bromo-2-methylcyclohexanecarboxylic acid; 4-, and 5-bromo-2-methylcyclohexanecarboxylic acid; 5- and 6-bromo-2-methylcyclohexanecarboxylic acid; 2,3-dibromo-2-methylcyclohexanecarboxylic acid; 2,5-dibromo-2-methylcyclohexanecarboxylic acid; 4,5-dibromo-2-methylcyclohexanecarboxylic acid; 5,6-dibromo - 2 - methylcyclohexanecarboxylic acid; 3-bromo-3-methylcyclohexanecarboxylic acid; 6-bromo-3-methylcyclohexanecarboxylic acid; 1,6-dibromo-3-methylcyclohexanecarboxylic acid; 2-bromo-4-methylcyclohexanecarboxylic acid; 1,2-dibromo-4-methylcyclohexanecarboxylic acid; 3-bromo-2,2,3-trimethylcyclopentanecarboxylic acid; 1-bromo - 3,5 - dimethylcyclohexanecarboxylic acid; homogentisic acid, o-, m-, and p-chlorobenzoic acid; anisic acid, salicyclic acid; p-hydroxybenzoic acid; β-resorcylic acid; gallic acid; veratric acid; trimethoxybenzoic acid; trimethoxycinnamic acid; 4,4'-dichlorobenzilic acid; o-, m-, and p-nitrobenzoic acid; cyanoacetic acid; 3,4- and 3,5-dinitrobenzoic acid; 2,4,6-trinitrobenzoic acid; thiocyanoacetic acid; cyanopropionic acid; and lactic acid. Examples of such alkoxyhydrocarbon carboxylic acids are ethoxyformic acid (ethyl hydrogen carbonate); butyloxyformic acid; pentyloxyformic acid; hexyloxy formic acid; dodecyloxyformic acid; hexadecyloxyformic acid, and the like.

They can also be esterified after the reaction but in that case the hydroxy group of the 2-hydroxyethyl group is also esterified. In fact, by using an equimolar amount, or less, of the esterifying agent a 1'-(2-acyloxyethyl)-1'-demethylclindamycin or analog thereof can be obtained without the 2-, 3-, or 4-hydroxy groups being acylated. The monoacylates thus obtained also have clindamycin-like antibacterial activity and can be used in a like manner.

Any or all of the 2-, 3-, and 4-hydroxy groups can also be etherified, for example, with alkyl, advantageously of not more than 20 carbon atoms; cycloalkyl, advantageously of from 3 to not more than 12 carbon atoms; or ylidene (e.g., 3,4-O-ylidene) group for example alkylidene, advantageously of not more than 20 carbon atoms and aralkylidene and vinylogs thereof, advantageously of not more than 12 carbon atoms. These ethers also have antibacterial activity. Examples of alkylidene are given above and examples of aralkylidene are furfurylidene, 5-methylfurfurylidene, benzylidene, m-tolylidene, o-tolylidene, p-tolylidene, o-chlorobenzylidene, m-chlorobenzylidene, m-bromobenzylidene, p-bromobenzylidene, p-methoxybenzylidene, m-methoxybenzylidene, o-methoxybenzylidene, 3,4-dimethoxybenzylidene, salicylidene, p-hydroxybenzylidene, 3,4,5-trimethoxybenzylidene, piperonylidene, o-nitrobenzylidene, p-chlorobenzylidene, m-nitrobenzylidene, p-nitrobenzylidene, β-naphthylidene, 2,4-dichlorobenzylidene, 3-methoxy-4-hydroxybenzylidene, terephthylidene, 3,4-dihydroxybenzylidene, and cinnamylidene.

The compounds of Formulas IA and IB exist either in the protonated or non-protonated forms according to the pH of the environment. When the protonated form is intended, the compound is qualified as an acid-addition salt and when the non-protonated form is intended it is qualified as the free base. The free bases can be converted to stable acid-addition salts by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclopentanepropionic, 1,2-cyclohexanedicarboxylic, 4-cyclohexanecarboxylic, octadecenylsuccinic, octenylsuccinic, methanesulfonic, benzenesulfonic, helianthic, Reinecke's dimethylidithiocarbamic, cyclohexylsulfamic, hexadecylsulfamic, octadecylsulfamic, sorbic, monochloroacetic, undecylenic, 4'-hydroxyazobenzene - 4 - sulfonic, octyldecylsulfuric, picric, benzoic, cinnamic, and like acids.

The acid- addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by metathesis. The free bases of Formulas IA and IB make good vehicles for toxic acids. For example, the fluosilicic acid addition salts are useful as mothproofing agents according to U.S. Pats. 1,915,334 and 2,075,359 and the hexafluoroarsenic acid and hexafluorophosphoric acid addition salts are useful as parasiticides according to U.S. Pats. 3,122,536 and 3,122,552. The thiocyanic acid addition salt when condensed with formaldehyde forms resinous materials useful as pickling inhibitors according to U.S. Pats. 2,425,320 and 2,606,155.

The close analog of clindamycin, i.e., where —$R_1H$ is cis or trans alkyl of not more than 8 carbon atoms and R is methyl, ethyl, or 2-hydroxyethyl, have antibacterial properties, and some are comparable or superior to linomycin and can be used for the same purpose as linomycin. The other analogues and isomers have similar antibacterial properties and can be used for the same purposes as lincomycin where larger amounts are not objectionable.

The following examples are illustrative of the process and products of the present invention but are not to be construed as limiting. The parts and percentages are by weight and the solvent ratios are by volume unless otherwise specified.

EXAMPLE 1

1'-(2-hydroxyethyl)-1'-demethyl-clindamycin

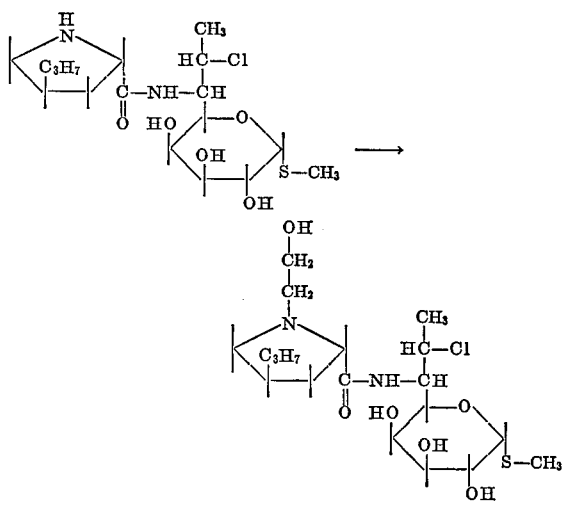

A mixture of 10 g. of 1'-demethylclindamycin·HCl, 100 ml. of ethyl alcohol and 50 ml. of ethylene oxide was sealed in a pressure flask and heated at 100° C. for one hour. The flask was then cooled to 0° C. and opened and the reaction mixture evaporated under vacuum to give a viscous amber oil. The oil was dissolved in 200 ml. of $H_2O$, and the pH adjusted to 10 with aqueous KOH solution. Extraction with $CHCl_3$ followed by evaporation of the extracts gave about 10 g. of crude product. This material was purified via chromatography over silica gel using a solvent system composed of ethyl acetate:acetone: water (8:5:1) for elution. The product fractions were identified by thin layer chromatography, combined, and evaporated to give 2.0 g. of 1'-(2-hydroxyethyl)-1'-demethylclindamycin.

*Analysis.*—Calcd. for $C_{19}H_{35}ClN_2O_6S$ (percent): C, 50.15; H, 7.75; N, 6.16; S, 7.05; Cl, 7.79. Found (percent): C, 50.13; H, 7.69; N, 6.26; S, 6.82; Cl, 8.08.

$[\alpha]_D^{CHCl_3}$ —25°.

Activity (in vitro, as the hydrochloride): Ca. 1×clindamycin—Gram-positive bacteria; Ca. 2×clindamycin—Gram-negative bacteria.

EXAMPLE 2

1'-(2-hydroxyethyl)-1'-demethyl-cis-clindamycin

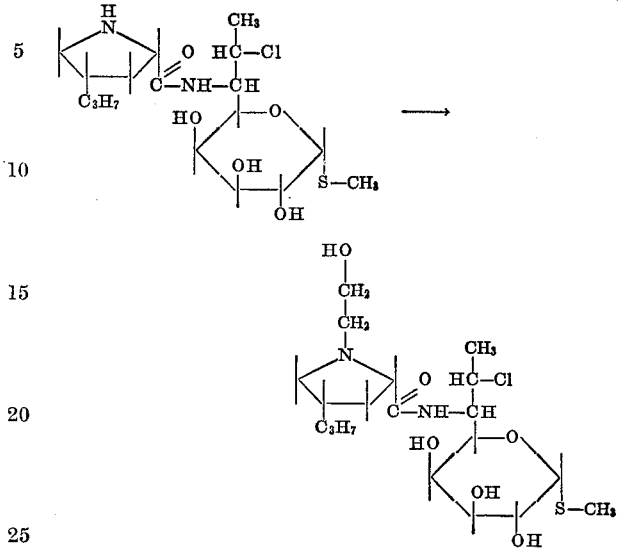

This reaction was carried out in the same manner as Example 1 using as starting material the appropriate cis isomer. A yield of 1.1 g. of 1'-(2-hydroxyethyl)-1'-demethyl-cis-clindamycin was obtained.

*Analysis.*—Calcd. for $C_{19}H_{35}ClN_2O_6S$ (percent): C, 50.15; H, 7.75; N, 6.16; S, 7.05; Cl, 7.79. Found (percent): C, 49.94; H, 7.81; N, 6.51; S, 6.87; Cl, 7.80.

$[\alpha]_D^{CHCl_3}$ +156°.

Activity (in vitro, as the hydrochloride): Ca. 0.2×clindamycin Gram-positive bacteria; >1×clindamycin vs. Gram-negative.

EXAMPLE 3

1'-(2-hydroxyethyl)-1'-demethyl-4'-depropyl-4'-cis- and trans-pentyl clindamycin

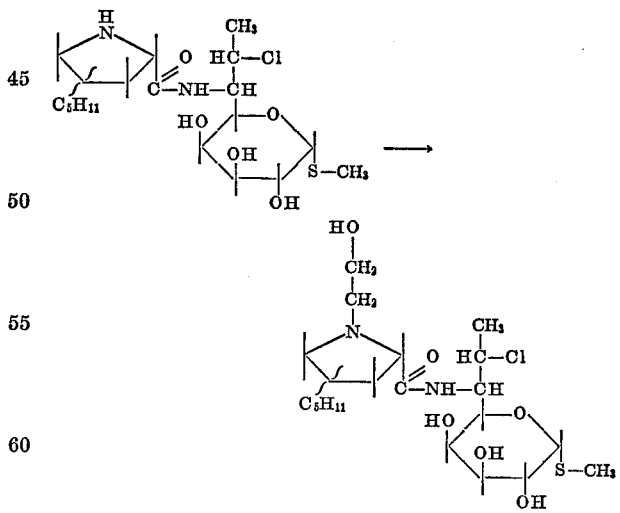

This reaction was carried out in the same manner as Example 1 using as starting material 1'-demethyl-4'-depropyl-4'-cis/trans - pentyl - clindamycin (Example 10 of U.S. Pat. 3,496,163). A yield of 5.0 g. of 1'-(2-hydroxyethyl)-1'-demethyl-4'-depropyl - 4' - cis/trans-pentyl-clindamycin was obtained.

*Analysis.*—Calcd. for $C_{21}H_{39}ClN_2O_6S$ (percent): C, 52.21; H, 8.14; N, 5.80; S, 6.64; Cl, 7.34. Found (percent): C, 52.16; H, 8.17; N, 5.83; S, 6.60; Cl, 7.32.

$[\alpha]_D^{CHCl_3}$ +154°.

Activity (in vitro, as the hydrochloride): Ca. 2×clindamycin vs. Gram-negative bacteria.

I claim:
1. A compound of the formula:

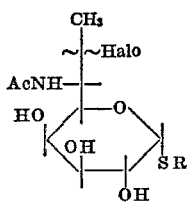

or the acid addition salts thereof wherein Halo is chlorine, bromine, or iodine, R is alkyl of not more than 4 carbon atoms or 2-hydroxyethyl, and Ac is the acyl radical of an L-2-pyrrolidinecarboxylic acid of the formula:

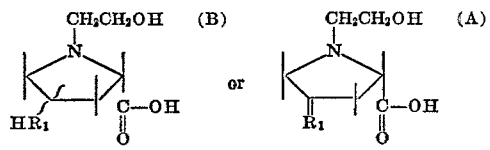

wherein $R_1$ is alkylidene of not more than 8 carbon atoms.

2. A compound or acid addition salt thereof according to claim 1 wherein Halo is chlorine, R is methyl, and Ac is the acyl of an L-2-pyrrolidinecarboxylic acid of the formula:

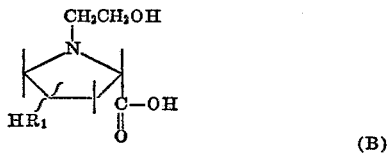   (B)

wherein $HR_1$ is propyl.

3. A compound or acid addition salt thereof according to claim 1 wherein Halo is chlorine, R is methyl and Ac is the acyl of an L-2-pyrrolidinecarboxylic acid of the formula:

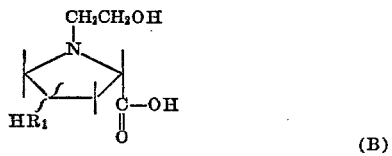   (B)

wherein $HR_1$ is trans propyl.

4. A compound or acid addition salt thereof according to claim 1 wherein Halo is chlorine, R is methyl, and Ac is the acyl of an L-2-pyrrolidinecarboxylic acid of the formula:

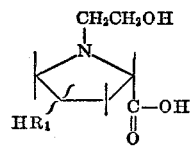   (B)

wherein $HR_1$ is pentyl.

5. A compound or acid addition salt thereof according to claim 1 wherein Halo is chlorine in the (S) configuration, R is methyl and Ac is the acyl of an L-2-pyrrolidinecarboxylic acid of the formula:

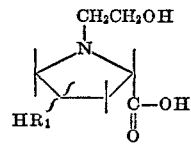   (B)

wherein $HR_1$ is trans propyl.

6. A compound or acid addition salt thereof according to claim 1 wherein Halo is chlorine in the (S) configuration, R is methyl and Ac is the acyl of an L-2-pyrrolidinecarboxylic acid of the formula:

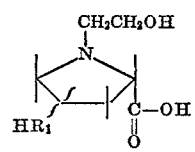   (B)

wherein $HR_1$ is pentyl.

References Cited
UNITED STATES PATENTS

| | | | |
|---|---|---|---|
| 3,380,992 | 4/1968 | Argoudelis et al. | 260—210 R |
| 3,583,972 | 6/1971 | Birkenmeyer et al. | 260—210 R |
| 3,585,185 | 6/1971 | Levis et al. | 260—210 R |

OTHER REFERENCES

Wagner et al.: "Synethetic Organic Chem.," 1953, John Wiley & Sons, Inc., New York, N.Y., p. 672.

JOHNNIE R. BROWN, Primary Examiner

U.S. Cl. X.R.

424—180

UNITED STATES PATENT OFFICE
CERTIFICATE OF CORRECTION

Patent No. 3,787,390                     Dated 1-22-74

Inventor(s) Robert D. Birkenmeyer

It is certified that error appears in the above-identified patent and that said Letters Patent are hereby corrected as shown below:

Column 1, title, for "ANALOGS OF LINCOMYCIN AND PROCESS" read -- ANALOGS OF LINCOMYCIN --. Columns 7 - 8, claim 4 should read:

-4-

A compound of the formula:

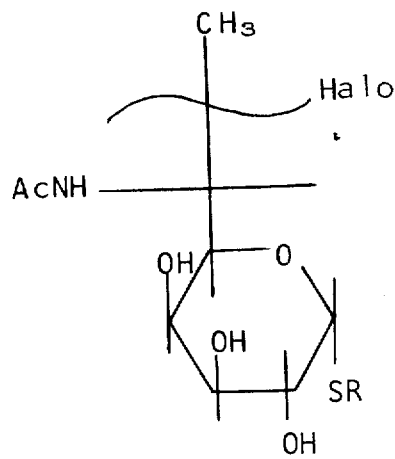

or the acid addition salts thereof wherein Halo is chlorine, bromine, or iodine; R is alkyl of not more than 4 carbon atom or 2-hydroxyethyl; and Ac is the acyl radical of an L-2-pyrrolidinecarboxylic acid of the formula:

UNITED STATES PATENT OFFICE
CERTIFICATE OF CORRECTION

Patent No. 3,787,390   Dated 1-22-74

Inventor(s) Robert D. Birkenmeyer

It is certified that error appears in the above-identified patent and that said Letters Patent are hereby corrected as shown below:

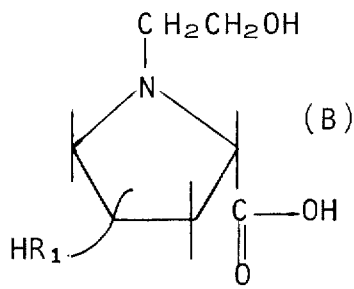   (B)   or   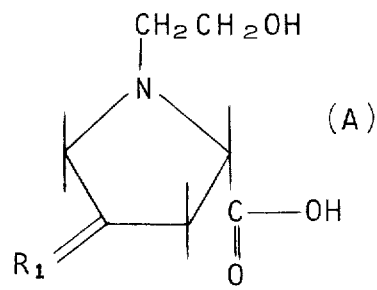   (A)

wherein $HR_1$ is alkyl of not more than 8 carbons and $R_1$ is alkylidene of not more than 8 carbon atoms.

Signed and sealed this 17th day of September 1974.

(SEAL)
Attest:

McCOY M. GIBSON JR.         C. MARSHALL DANN
Attesting Officer           Commissioner of Patents

-2-